US010609261B2

(12) United States Patent
Kimura

(10) Patent No.: US 10,609,261 B2
(45) Date of Patent: Mar. 31, 2020

(54) OPTICAL CAMERA TO BE MOUNTED ON VEHICLES

(71) Applicant: DENSO CORPORATION, Kariya, Aichi-pref. (JP)

(72) Inventor: Masao Kimura, Kariya (JP)

(73) Assignee: DENSO CORPORATION, Kariya, Aichi-pref. (JP)

( * ) Notice: Subject to any disclaimer, the term of this patent is extended or adjusted under 35 U.S.C. 154(b) by 0 days.

(21) Appl. No.: 16/280,361

(22) Filed: Feb. 20, 2019

(65) Prior Publication Data

US 2019/0260916 A1 Aug. 22, 2019

(30) Foreign Application Priority Data

Feb. 22, 2018 (JP) .................................. 2018-029675

(51) Int. Cl.
*H04N 5/225* (2006.01)
*H04N 7/18* (2006.01)
*B60R 11/04* (2006.01)
*B60R 16/00* (2006.01)
*B60R 11/00* (2006.01)

(52) U.S. Cl.
CPC ........... *H04N 5/2252* (2013.01); *B60R 11/04* (2013.01); *B60R 16/00* (2013.01); *H04N 7/183* (2013.01); *H04N 7/185* (2013.01); *B60R 2011/0003* (2013.01)

(58) Field of Classification Search
CPC .................................................... H04N 5/2252
USPC ............................................................ 348/373
See application file for complete search history.

(56) References Cited

U.S. PATENT DOCUMENTS

2012/0207461 A1 8/2012 Okuda
2014/0160290 A1* 6/2014 Wu ........................ B60R 1/00
348/148
2017/0372176 A1* 12/2017 Hibino ................... G06K 9/209

FOREIGN PATENT DOCUMENTS

JP 5316562 B2 10/2013

* cited by examiner

*Primary Examiner* — Joel W Fosselman
(74) *Attorney, Agent, or Firm* — Knobbe, Martens, Olson & Bear, LLP

(57) ABSTRACT

There is provided an optical camera to be mounted on vehicles. The optical camera includes a housing, a camera module held in the housing, and a radio communication unit held in the housing. In the optical camera, the radio communication unit is configured to transmit image data produced by the camera module to the outside of the housing.

12 Claims, 5 Drawing Sheets

OPTICAL CAMERA TO BE MOUNTED ON VEHICLES

CROSS-REFERENCE TO RELATED APPLICATION

This application is based on and claims the benefit of priority from earlier Japanese Patent Application No. 2018-29675 filed Feb. 22, 2018, the description of which is incorporated herein by reference.

BACKGROUND OF THE INVENTION

Technical Field of the Invention

The present disclosure relates to an optical camera to be mounted on vehicles.

Related Art

There is a technique that has been put into practice with which an optical camera is mounted to a vehicle so that images captured by the camera are used for assisting driving of the vehicle. This technique related to an optical camera is disclosed in JP 5316562 B.

In recent years, it is required that an optical camera to be mounted in a vehicle is able to capture images of wide view angles and high-resolution levels. For this reason, such an optical camera is required to have an increasing number of pixels for the imaging. Moreover, optical cameras to be mounted to vehicles are provided with additional new functions. Accordingly, the volume of images produced by such an optical camera is increasing. To externally transmit high-capacity image data, the optical camera needs to be provided with a dedicated cable, connector, or the like.

However, provision of such a dedicated cable, connector, or the like increases the size of the optical camera to be mounted to vehicles. It is preferable that such optical cameras are miniaturized so that the driver's visual field will not be blocked.

SUMMARY

It is thus desired to provide an optical camera to be mounted to vehicles, which can dispense with a dedicated cable, connector, or the like, but can still transmit image data to the outside of the optical camera.

An aspect of the present disclosure is an optical camera to be mounted to vehicles. The optical camera includes a housing, a camera module held in the housing, and a radio communication unit held in the housing. In the optical camera, the radio communication unit is configured to transmit image data produced by the camera module to the outside of the housing. In addition, the housing has at least a part provided by an electrically insulating member, and the radio communication unit is located to be opposed directly or obliquely to the electrically insulating member.

In the optical camera to be mounted to vehicles, which is an aspect of the present disclosure, the radio communication unit is capable of transmitting image data produced by the camera module to the outside of the housing. Thus, the optical camera to be mounted to vehicles, which is an aspect of the present disclosure, does not need to be equipped with a dedicated cable, connector, or the like to transmit the image data. Consequently, the optical camera to be mounted to vehicles can be miniaturized.

It should be noted that the bracketed references shown in this section and in the claims indicate correspondence with specific means described in the embodiments set forth below as modes, and should not limit the technical scope of the present disclosure.

DETAILED DESCRIPTION OF THE PREFERRED EMBODIMENTS

With reference to the drawings, exemplary embodiments of an optical camera to be mounted to vehicles will be described.

[First Embodiment]

<Configuration of Optical Camera>

Referring to FIGS. 1 to 4, a configuration of an optical camera 1 to be mounted on vehicles will be described. Hereinafter, the optical camera 1 may also be referred to as an in-vehicle camera 1. The in-vehicle camera 1 is installed in the interior of a vehicle VE so as to be located at a position facing the windshield WS, by using a not-shown bracket one end of which is attached to the wall of the interior.

Figure 1:
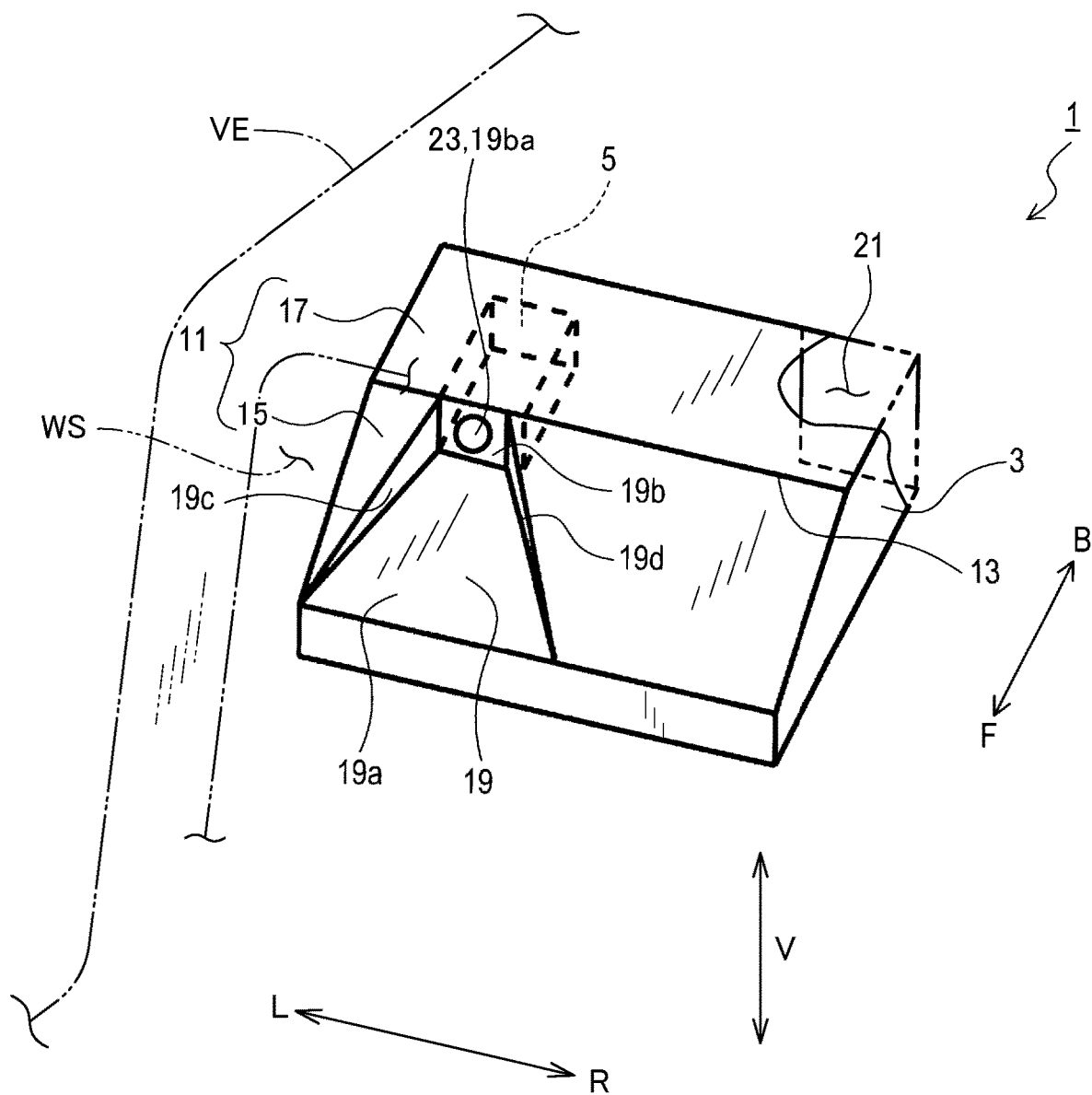
FIG. 1 is a perspective view illustrating a configuration of an optical camera to be mounted to vehicles, according to a first embodiment of the present disclosure.

As shown in FIG. 1, the in-vehicle camera 1, which is composed of an optical camera, includes a housing 3, and a camera module 5. The housing 3 is made of a material having radio shielding properties. Examples of the material having radio shielding properties include metal, and resins containing fillers having electrical conductivity.

Figure 2:
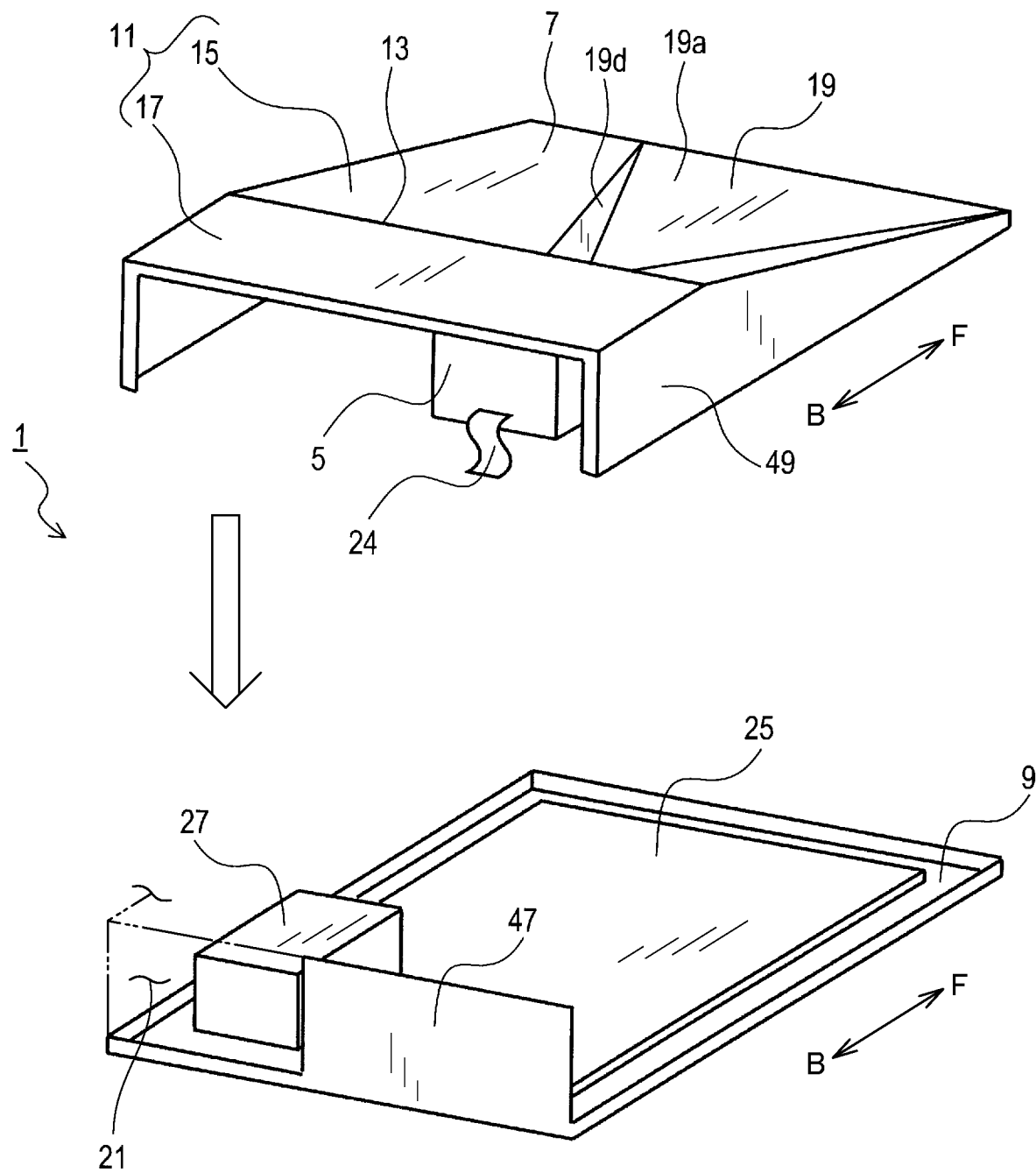
FIG. 2 is an exploded perspective view illustrating the configuration of the optical camera.

As shown in FIG. 2, the housing 3 includes an upper cover 7, and a lower cover 9. The upper cover 7 has an upper surface 11 opposed to the windshield, and, by a ridge 13 passing across upper surface 11, is sectioned into an upper surface front part 15 and an upper surface rear part 17. The upper surface front part 15 slants downward in a forward F direction. The forward F direction refers to the forward direction of the vehicle to which the in-vehicle camera 1 is mounted. The upper surface rear part 17 has a horizontal surface. The upper surface front part 15 is provided with a recess 19 which sinks lower than the ridge 13 in a vehicle vertical direction V. The recess 19 includes an in-recess upper surface 19a, a lens mounting surface 19b, and a pair of left and right side surfaces 19c and 19d. The in-recess upper surface 19a is located to be opposed to the windshield and has an inclination that is gentler than that of the rest of the upper surface front portion 15. The lens mounting surface 19b stands up substantially vertically on a rearward B side of the in-recess upper surface 19a, and is oriented forward F. The lens mounting surface 19b is formed to have a hole 19ba through which a later-described lens 23 is opposed toward outside of the vehicle. A rearward B is directed oppositely to forward F. The housing 3 is provided with an opening 21 on the rearward B side. The opening 21 is formed into, for example, a rectangle, and allows communication between the interior and the exterior of the housing 3.

As shown in FIGS. 1 and 2, the camera module 5 is held in the housing 3. The camera module 5 is provided with a lens 23 on the forward F side and a lens barrel which is not shown in the drawings. The camera module 5 is mounted to the housing 3 such that the lens 23 housed in the lens barrel is exposed toward outside via the hole 19ba of the lens mounting surface 19b. The camera module 5 optically captures an image in the forward direction of the vehicle, so that optical images coming from the front side of the vehicle via the windshield is focused by a not-shown imager in the camera module 5. Thus the imager generates image data. The camera module 5 and a camera connector 28, which will be described later, are connected to each other through a flexible cable 24.

Figure 4:
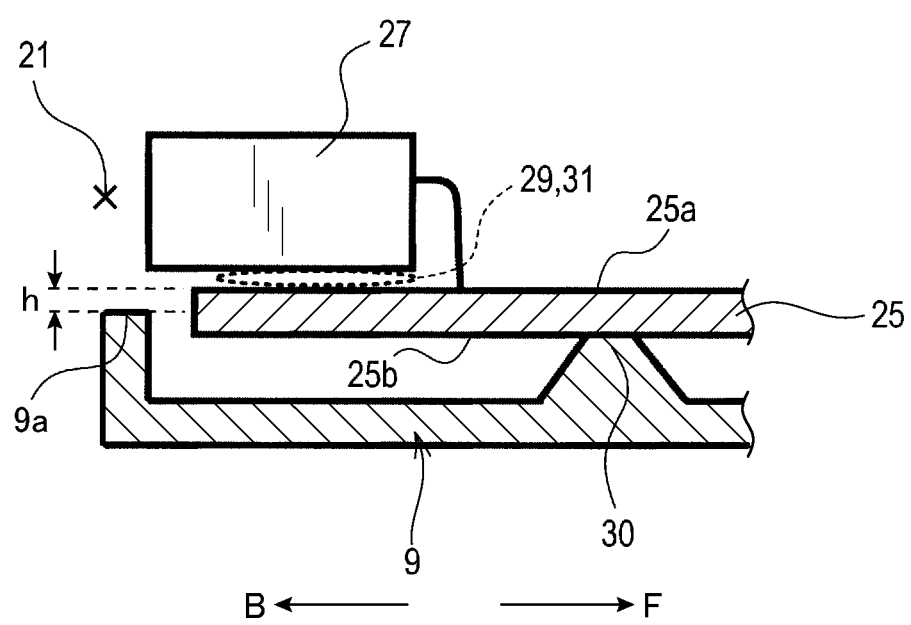
FIG. 4 is a side view illustrating a configuration of a lower cover, the electronic substrate, and a vehicle connector of the optical camera.

As shown in FIG. 2, the in-vehicle camera 1 includes an electronic substrate 25, and a vehicle connector 27. The electronic substrate 25 is held in the housing 3, with electronic parts being provided thereto to perform image processing for the captured image data, power supply, and the like. As shown in FIG. 4, the lower cover 9 has a screw part 30 protruding upward. The electronic substrate 25 is fixed to the screw part 30 by a screw.

Figure 3:
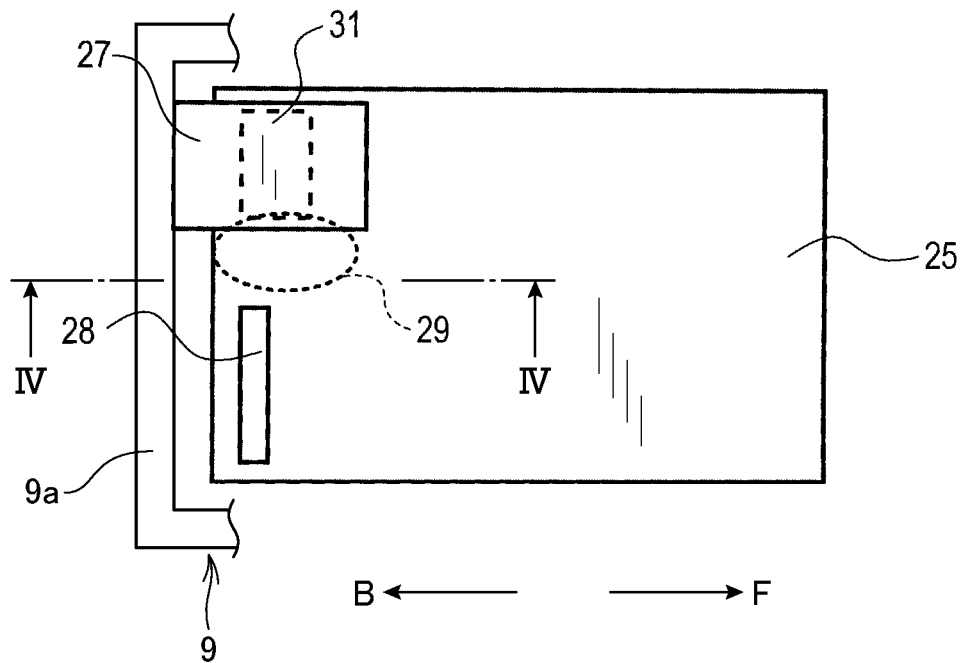
FIG. 3 is a plan view illustrating a configuration of an electronic substrate of the optical camera.

As shown in FIG. 3, the electronic substrate 25 is provided with a camera connector 28 to which the flexible cable 24 is connected. The image data produced by the camera module 5 is transmitted to the electronic substrate 25 through the flexible cable 24 and the camera connector 28.

As shown in FIG. 3, the electronic substrate 25 includes a radio control unit 29 and an antenna part 31. The radio control unit 29 and the antenna part 31 correspond to the radio communication unit. The radio control unit 29 performs radio communication to transmit image data to the outside of the housing 3.

As shown in FIG. 4, the electronic substrate 25 has an upper surface 25a on which the radio control unit 29 and the antenna part 31 are provided, in which the upper surface 25a is opposed to the inner surface of the upper cover 7. As shown in FIGS. 3 and 4, the antenna 31 is provided to the electronic substrate 25 so as to be located at a position confronting the opening 21 directly or obliquely thereto. With this positioning, the antenna part 31 can output radio waves to the outside of the housing 3 through the opening 21. As shown in FIG. 4, the lower cover 9 has an upper end 9a confronting the opening 21 and positioned lower than the upper surface 25a (refer to a reference symbol "h") in the vertical direction V. Therefore, the lower cover 9 is less likely to shield the radio waves outputted from the antenna part 31.

The radio control unit 29 is disposed near the antenna part 31. It is preferable that the electronic parts, which are sources of noise, are provided to a lower surface 25b of the electronic substrate 25. The lower surface 25b is positioned to be opposed to the inner surface of the lower cover 9.

As shown in FIGS. 3 and 4, the vehicle connector 27 is disposed above the antenna part 31 so as to be located at a position confronting the opening 21. The vehicle connector 27 is made of an insulating material. The vehicle connector 27 corresponds to the electrically insulating member. The antenna part 31 is located nearer to the vehicle connector 27 than to metal members of the in-vehicle camera 1. The radio control unit 29 may be located below the vehicle connector 27, or may be located at any other positions.

<Advantageous Effects Exerted by the in-Vehicle Camera>

(1A) According to the in-vehicle camera 1, the radio control unit 29 and the antenna part 31 can transmit the image data produced by the camera module 5 to the outside of the housing 3. Accordingly, the in-vehicle camera 1 can dispense with a cable, connector, or the like for transmitting the image data to the outside of the housing 3. Since there is no need of providing a cable, connector, or the like, the in-vehicle camera 1 can be miniaturized.

(1B) The radio control unit 29 and the antenna part 31 are included in the electronic substrate 25. Accordingly, there is no need of providing a module for making radio communication, separately from the electronic substrate 25.

(1C) The housing 3 is provided with the opening 21, and the antenna part 31 is at a position confronting the opening 21. The antenna part 31 can externally outputs radio waves through the opening 21. Accordingly, the radio waves outputted from the antenna part 31 are prevented from being shielded by the housing 3. It should be noted that the vehicle connector 27, which is made of an insulating material, is less likely to shield the radio waves outputted from the antenna part 31.

[Second Embodiment]

<Differences from the First Embodiment>

Since the second embodiment has a basic configuration similar to that of the first embodiment, the following description is focused on the differences from the first embodiment. It should be noted that the components identical with or similar to those of the first embodiment are given the same reference numerals for the sake of omitting unnecessary explanation. For these components, the preceding description should be referred to.

Figure 5:
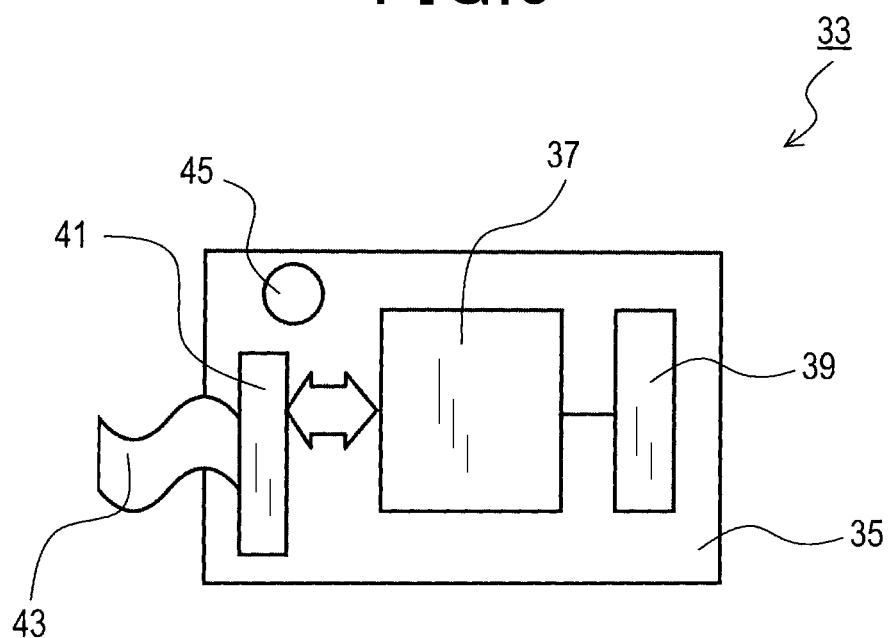
FIG. 5 is a plan view illustrating a configuration of a radio communication unit of an optical camera to be mounted to vehicles, according to a second embodiment of the present disclosure.

In the first embodiment described above, the electronic substrate 25 includes the radio control unit 29 and the antenna part 31. The second embodiment is different from the first embodiment in that the in-vehicle camera 1 is provided with a radio communication unit 33 shown in FIG. 5, separately from the electronic substrate 25.

The radio communication unit 33 includes a substrate 35, a radio control unit 37, an antenna part 39, a connector part 41, a flexible cable 43, and a screw part 45.

The radio control unit 37, the antenna part 39, and the connector part 41 are mounted to the substrate 35. The flexible cable 43 has an end connected to the connector part 41, and the other end connected to the electronic substrate 25. The radio communication unit 33 receives image data from the electronic substrate 25 through the connector part 41 and the flexible cable 43.

The antenna part 39 includes a chip, a pattern antenna, and a frequency adjustment circuit. The radio control unit 37 and the antenna part 39 transmit image data to the outside of the housing 3 using radio communication.

The radio communication unit 33 is fixed to the housing 3 at the screw part 45. Moreover, the screw part 45 establishes a GND connection between the radio communication unit 33 and the housing 3.

Figure 6:
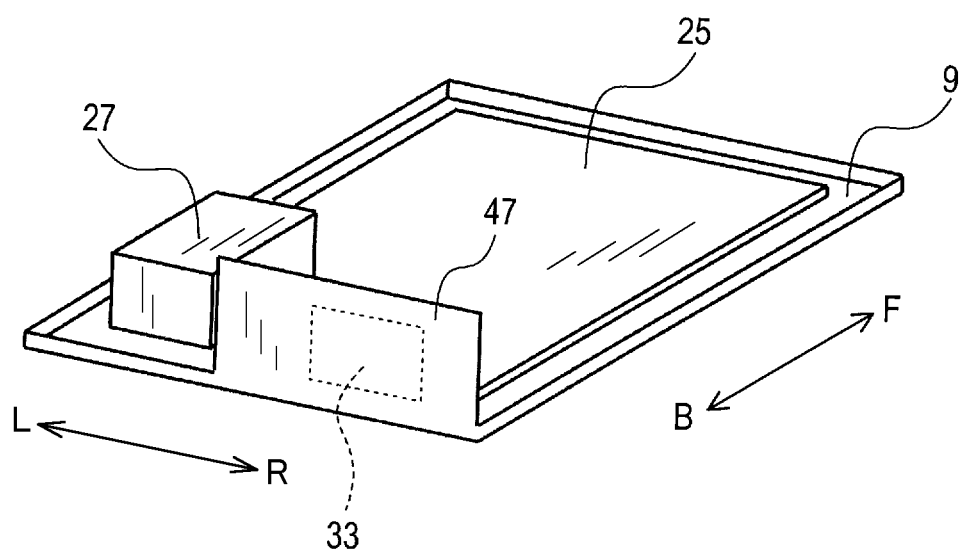
FIG. 6 is a perspective view illustrating an arrangement example of the radio communication unit.

The radio communication unit 33 may be installed, for example, at the position indicated in FIG. 6. Inside the housing 3, the radio communication unit 33 is located on the rearward B side, and faces a rear plate 47. The rear plate 47, which is made of an insulating material, is provided as the rearward B side of the housing 3 and is built upward in the vertical direction V. The antenna part 31 is located nearer to the rear plate 47 than to metal members of the in-vehicle camera 1. The rear plate 47 corresponds to the electrically insulating member. The substrate 35 configuring the radio communication unit 33 is perpendicular to the electronic substrate 25, and is parallel to the rear plate 47.

Figure 7:
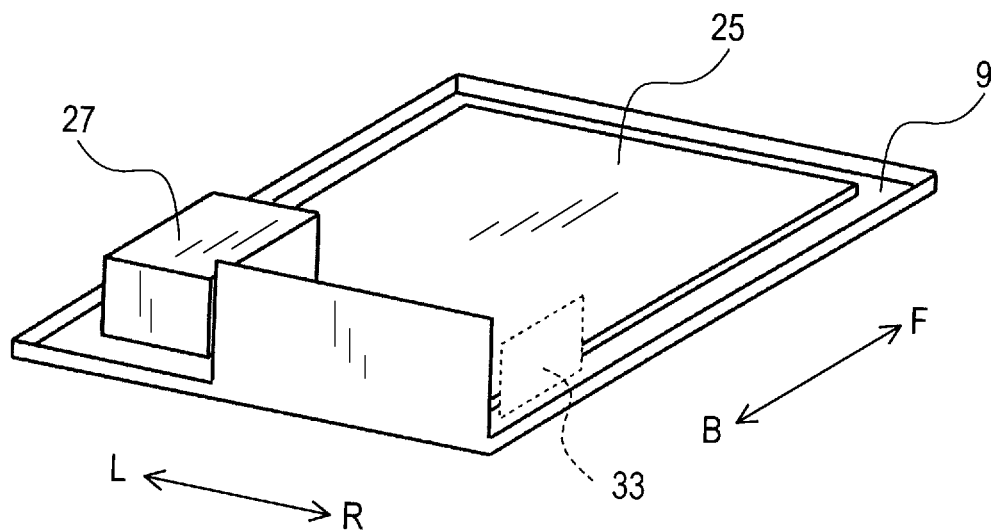
FIG. 7 is a perspective view illustrating an arrangement example of the radio communication unit.

The radio communication unit 33 may, for example, be disposed at the position indicated in FIG. 7. In the housing 3, the radio communication unit 33 in this case is located on the rearward B side that is on the rightward R side, and faces a lateral plate 49 shown in FIG. 2. In the lateral plate 49, the portion facing the radio communication unit 33 (termed lateral facing portion hereinafter) is made of an insulating material. The antenna part 39 is located nearer to the lateral facing portion than to metal members of the in-vehicle camera 1. The lateral facing portion corresponds to the electrically insulating member.

In the arrangement shown in FIG. 7, the substrate 35 provided in the radio communication unit 33 is perpendicular to the electronic substrate 25, and is parallel to the lateral plate 49.

Figure 8:
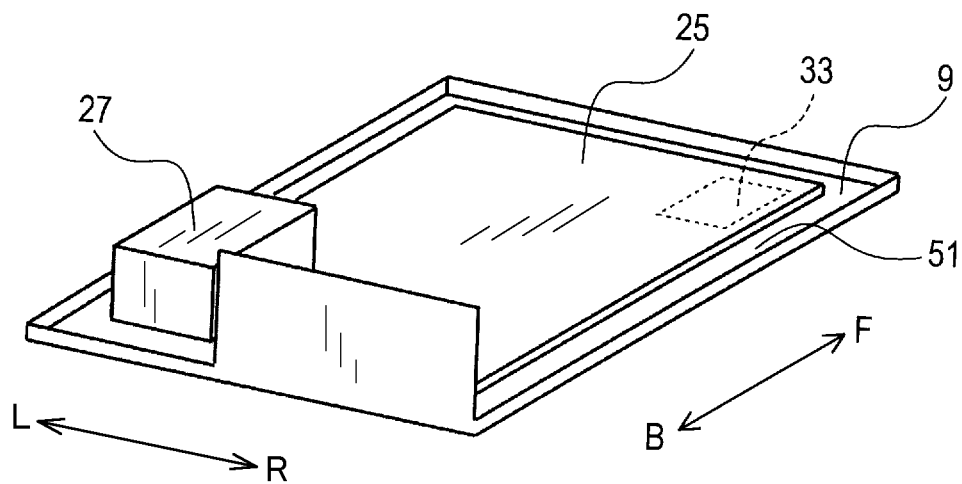
FIG. 8 is a perspective view illustrating an arrangement example of the radio communication unit.

The radio communication unit 33 may, for example, be disposed at the position shown in FIG. 8. Inside the housing 3, the radio communication unit 33 in this case is located on the forward F side, and faces a bottom plate 51 of the housing 3. In the bottom plate 51, the portion facing the radio communication unit 33 (termed "bottom facing portion" hereinafter) is made of an insulating material. The antenna part 39 is located nearer to the bottom facing portion than to metal members of the in-vehicle camera 1. The bottom facing portion corresponds to the electrically insulating member. The substrate 35 is parallel to the electronic substrate 25.

In the arrangement shown in FIG. 8, the radio communication unit 33 faces the electronic substrate 25. In the electronic substrate 25, the portion facing the antenna part 39 is preferably not provided with a metal pattern. In this case, the antenna part 39 is prevented from picking up noise that would otherwise have been caused by the metal pattern.

<Advantageous Effects Exerted by the in-Vehicle Camera>

According to the second embodiment specifically described above, the following advantageous effects are exerted in addition to the advantageous effects described in the item (1A) of the first embodiment.

(2A) The in-vehicle camera 1 includes the radio communication unit 33. The radio communication unit 33, which is a member separate from the electronic substrate 25, ensures a high degree of freedom, when arranged, in the position or direction.

(2B) In the housing 3, the radio communication unit 33 faces a portion made of an insulating material, and can externally output radio waves from this portion made of an insulating material. Thus, the radio waves outputted from the antenna part 39 are prevented from being shielded by the housing 3.

(2C) The antenna part 39 is located nearer to the portion made of an insulating material of the housing 3 than to metal members of the in-vehicle camera 1. Thus, the antenna part 39 is less likely to pick up noise that would otherwise have been caused by the metal members.

[Other Embodiments]

Some embodiments of the present disclosure have so far been described. However, the present disclosure should not be limited to the embodiments described above, but may be implemented in various modifications.

(1) A plurality of functions of one component in the embodiment described above may be implemented by a plurality of components, or one function of one component may be implemented by a plurality of components. Furthermore, a plurality of functions of a plurality of components may be implemented by one component, or one function implemented by a plurality of components may be implemented by one component. Furthermore, part of the configurations of the embodiments set forth above may be omitted. Furthermore, at least part of the configuration of an embodiment set forth above may be added to or replaced by the configuration of another embodiment set forth above. It should be noted that all the modes encompassed by the technical idea that is specified by the language of the claims should be the embodiments of the present disclosure.

(2) The foregoing embodiments are described such that the electrical insulating material is composed by using a part of the housing 3, but this is not always an only measure for that configuration. On the inner surface of the rear plate 47, the lateral plate 49, or the bottom facing portion of the bottom plate 51, to which the substrate 35 of the radio communication unit 33 is opposed, may have an electrically insulating member whose size corresponds to the substrate 35. This addition of the electrically insulating member provides the similar advantageous operations described already.

(3) Besides the in-vehicle camera described above, the present disclosure can be implemented in various modes, such as a system including the in-vehicle camera as a component, a method of manufacturing an optical camera to be mounted to vehicles, or any other modes.

What is claimed is:

1. An optical camera to be mounted on vehicles, comprising:
a housing;
a camera module held in the housing; and
a radio communication unit held in the housing, wherein
the radio communication unit is configured to transmit image data produced by the camera module to the outside of the housing,
the housing has at least a part provided by an electrically insulating member,
the radio communication unit is located to be opposed to the electrically insulating member, and
an antenna is provided to the radio communication unit and opposes the electrically insulating member.

2. The optical camera to be mounted on vehicles according to claim 1, wherein:
the optical camera further comprises an electronic substrate held in the housing; and
the radio communication unit is included in the electronic substrate.

3. The optical camera to be mounted on vehicles according to claim 2, wherein the antenna provided to the radio communication unit faces the electrically insulating member.

4. The optical camera to be mounted on vehicles according to claim 1, wherein the radio communication unit includes a substrate, and a radio control unit which is mounted to the substrate.

5. The optical camera to be mounted on vehicles according to claim 4, wherein the electrically insulating member is arranged parallel to the substrate.

6. The optical camera to be mounted on vehicles according to claim 5, wherein the electrically insulating member is provided by the housing.

7. The optical camera to be mounted on vehicles according to claim 5, wherein the antenna is located nearer to the electrically insulating member than to metal members of the optical camera.

8. The optical camera to be mounted on vehicles according to claim 4, wherein the electrically insulating member is provided by the housing.

9. The optical camera to be mounted on vehicles according to claim 8, wherein the antenna is located nearer to the electrically insulating member than to metal members of the optical camera.

10. The optical camera to be mounted to vehicles according to claim 4, wherein the antenna is located nearer to the electrically insulating member than to metal members of the optical camera.

11. The optical camera to be mounted on vehicles according to claim 4, wherein the antenna provided to the radio communication unit faces the electrically insulating member.

12. An optical apparatus to be mounted onto a vehicle, comprising:
a housing;
an optical sensor module held in the housing; and
a radio communication unit held in the housing, wherein
the radio communication unit is configured to transmit data which is produced by the optical sensor module to the outside of the housing,
the housing has at least a part provided by an electrically insulating member,
the radio communication unit is located to be opposed to the electrically insulating member, and
an antenna is provided to the radio communication unit and opposes the electrically insulating member.

* * * * *